United States Patent [19]
Yamazaki

[11] Patent Number: 5,000,549
[45] Date of Patent: Mar. 19, 1991

[54] ZOOM LENS FOR STABILIZING THE IMAGE

[75] Inventor: Shoichi Yamazaki, Kanagawa, Japan

[73] Assignee: Canon Kabushiki Kaisha, Tokyo, Japan

[21] Appl. No.: 412,429

[22] Filed: Sep. 26, 1989

[30] Foreign Application Priority Data

Sep. 30, 1988 [JP] Japan .................. 63-246646

[51] Int. Cl.⁵ .................. G02B 15/15; G02B 27/64
[52] U.S. Cl. .................. 350/423; 350/500
[58] Field of Search .............. 350/427, 500, 247, 423

[56] References Cited

U.S. PATENT DOCUMENTS 4,844,602  7/1989  Kitagishi ................... 350/500
4,907,868  3/1990  Kitagishi et al. ............ 350/463

FOREIGN PATENT DOCUMENTS 0063014  6/1978  Japan ..................... 350/423

Primary Examiner—Bruce Y. Arnold
Assistant Examiner—Rebecca D. Gass
Attorney, Agent, or Firm—Fitzpatrick, Cella, Harper & Scinto

[57] ABSTRACT

A zoom lens is disclosed, comprising a front lens group including a compensation lens sub-group arranged to move in a direction having a directional component transverse to the optical axis in order to stabilize the image, and a rear lens group positioned in the rear of the front lens group, the front and rear lens groups being moved along the optical axis when zooming is performed.

12 Claims, 11 Drawing Sheets (W)

(T)

ZOOM LENS FOR STABILIZING THE IMAGE

BACKGROUND OF THE INVENTION

1. Field of the Invention

This invention relates to an optical system for compensating for the shake of a photographic image to obtain a stable image and, more particularly, zoom lenses for stabilizing the image by decentering a lens group constituting part of this optical system wherein the decentering aberrations, which are produced when the lens of this part is decentered, are suppressed, thus providing zoom lenses which enable a good optical performance to be obtained.

2. Description of the Related Art

When taking shots from on a running car, flying aircraft or other moving bodies, vibrations propagate to the photographic system, causing the photographic image to shake.

In the past, image stabilizing optical systems having the function of preventing image shaking have been proposed in, for example, Japanese Laid-Open Patent Application No. Sho 50-80147, Japanese Patent Publication No. Sho 56-21133 and Japanese Laid-Open Patent Application No. Sho 61-223819.

In the Japanese Laid-Open Patent Application No. Sho 50-80147, for a zoom lens having two afocal variable magnification systems, letting the angular magnification of the first variable magnification system be denoted by $M_1$ and the angular magnification of the second variable magnification system by $M_2$, variation of the image magnification is performed by each variable magnification system while having the relationship: $M_1 = 1 - (1/M_2)$. Along this zoom lens, the second variable magnification system is spatially fixed to compensate for the shake of the image. Thus, stabilization of the image is achieved.

In the Japanese Patent Publication No. Sho 56-21133, responsive to the output signal from the detecting means for detecting the vibrating state of the optical device, an optical member which is part of the optical device is made to move in such a direction as to cancel the vibratory displacement of the image due to the vibrations, so that stabilization of the image is achieved.

In the Japanese Laid-Open Patent Application No. Sho 61-223819, a photographic system is formed to include a refraction type variable angle prism arranged on the most object side and the vertex angle of the refraction type variable angle prism is made to vary in correspondence with the vibration of the photographic system to deflect the image. In such a way, stabilization of the image is achieved.

In other documents such as Japanese Patent Publication No. Sho 56-34847 and Japanese Patent Publication No. Sho 57-7414, an optical member constituting part of the photographic system is arranged to be spatially fixed against vibrations. By utilizing the prism effect this optical member generates for the vibrations, the photographic image is made to deflect so that the stable image is obtained on the image plane.

Also, an image stabilization method is known where an acceleration sensor is utilized to detect the vibrations of the photographic system. Responsive to the signal obtained in real time, part of the photographic system, or a lens group, is made to oscillate in a direction perpendicular to the optical axis.

In a mechanism for oscillating the lens group constituting part of the photographic system to remove the shake of the photographic image to obtain the stable image, the photographic system is generally required to be of such a form that the lens group movable for compensating for the shake of the image is small in size and light in weight, the relationship between the amount of compensation for the shake of the image and the amount of movement of the movable lens group is simplified, and the time necessary for computing the transformation is shortened.

Also, if decentering of the movable lens group allows large decentering coma, decentering astigmatism and decentering curvature of field, etc. to be produced, the compensation for the shake of the image will, because of the decentering aberrations, result in blurring of the image. For example, the decentering distortion, when increased largely, causes a shifted amount of the paraxial portion of the image and a shifted amount of the marginal portion of the image to become different from each other. For this reason, with the paraxial portion of the image being aimed, when the movable lens group is decentered to compensate for the shake of the image, it is in the marginal portion that a similar phenomenon to the shake of the image begins to take place. This causes an extreme lowering of the optical characteristics.

For this reason, for an image stabilization photographic system, particularly a variable magnification optical system, it is desired that when the movable lens group is moved in the direction perpendicular to the optical axis to effect decentering, the amount of decentering aberrations produced will be small, the lowering of the optical performance will be slight, and the structure of the operating mechanism will be simple.

However, a photographic system which can satisfy all the above-described various conditions is, in general terms, very difficult to obtain. Particularly when provision for decentering is made in that part of the photographic system which is a lens group having a refractive power, the optical performance is largely lowered, thus creating the drawback that a good quality image is sacrificed.

Related art of the invention are disclosed in U.S. patent application Ser. Nos. 261,231 filed on Oct. 24, 1988 and 346,512 filed on May 2, 1989, etc.

SUMMARY OF THE INVENTION

A first object of the invention as applied to a variable magnification optical system which is partly made to move as a compensation lens group to decenter relative to an optical axis thereof when the shake of the image is compensated for, is to choose a lens group of small size and light weight as the compensation lens group and moreover to achieve simplification on the structure of construction of an operating mechanism for decentering the compensation lens group.

A second object is to provide a variable magnification optical system having a capability of stabilizing the image, while still permitting good optical performance to be obtained with minimization of the amount of the above-described various decentering aberrations produced when the compensation lens group is parallel-decentered.

Thus, a zoom lens of the invention has features that in order to stabilize the image, it has a front lens group including a compensation lens sub-group which moves in a direction having a directional component transverse to the optical axis, and a rear lens group positioned in the rear of the front lens group, and that the front and rear lens groups are moved along the optical axis to effect zooming.

In the diagrams of the aberrations, (W) represents the wide-angle end, (T) the telephoto end, M the meridional image surface, and S the sagittal image surface.

DETAILED DESCRIPTION OF THE PREFERRED EMBODIMENTS

Figure 1:
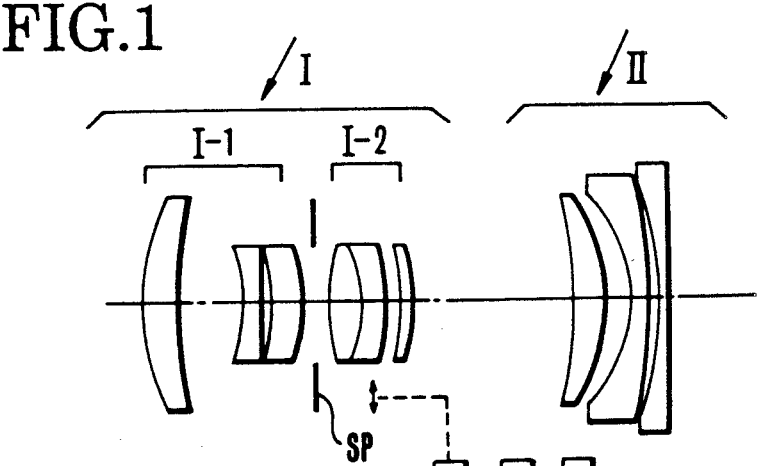
FIG. 1 to FIG. 3 are longitudinal section views of numerical examples 1 to 3 of lenses of the invention.
Figure 2:
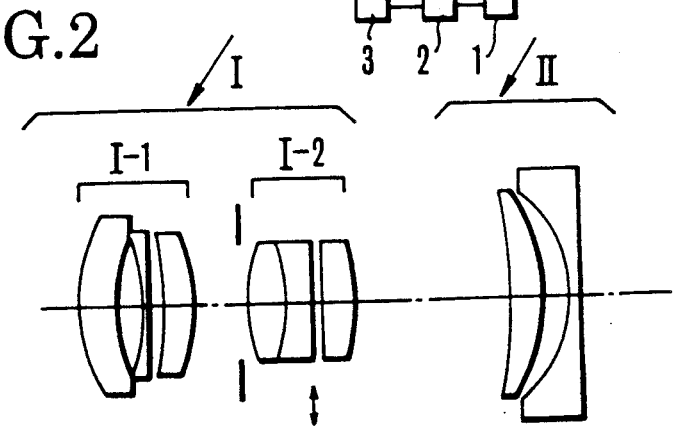
Figure 3:
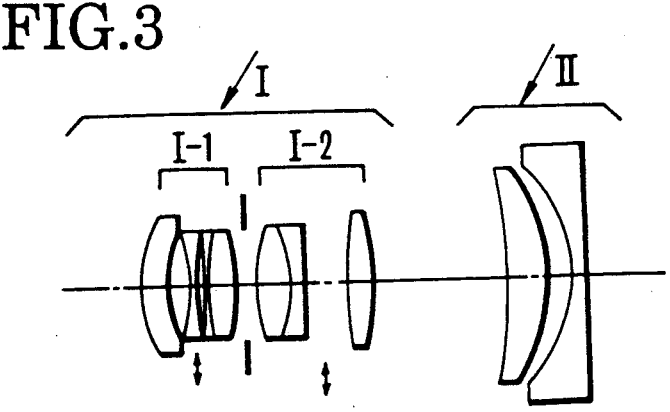
Figure 4A:
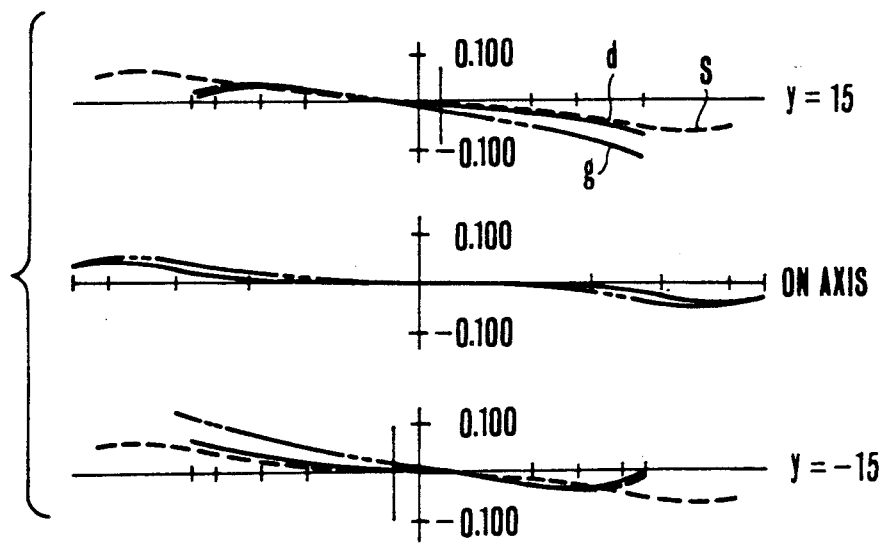
FIGS. 4A to 4D, FIGS. 6A to 6D and FIGS. 8A to 8D are aberration curves in the standard state of the numerical examples 1 to 3 of the invention.
Figure 4B:
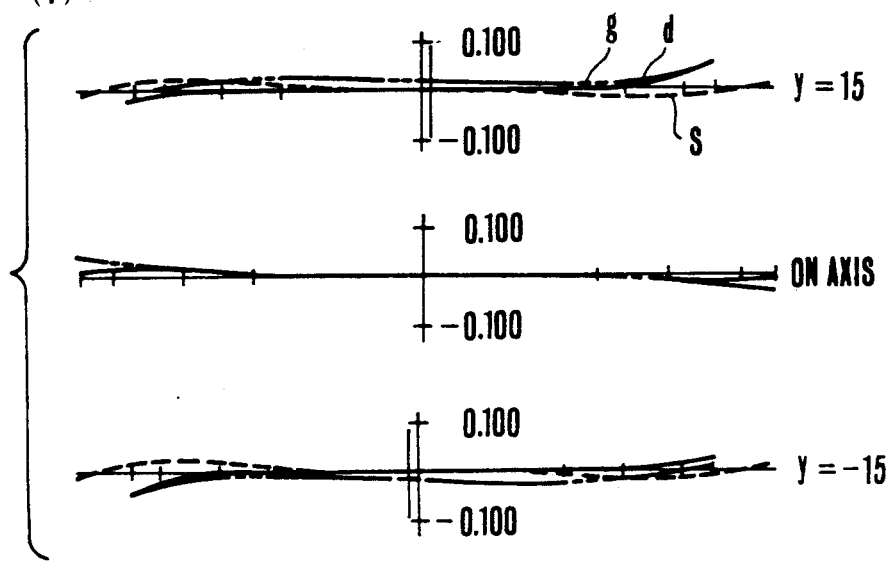
Figure 4C:
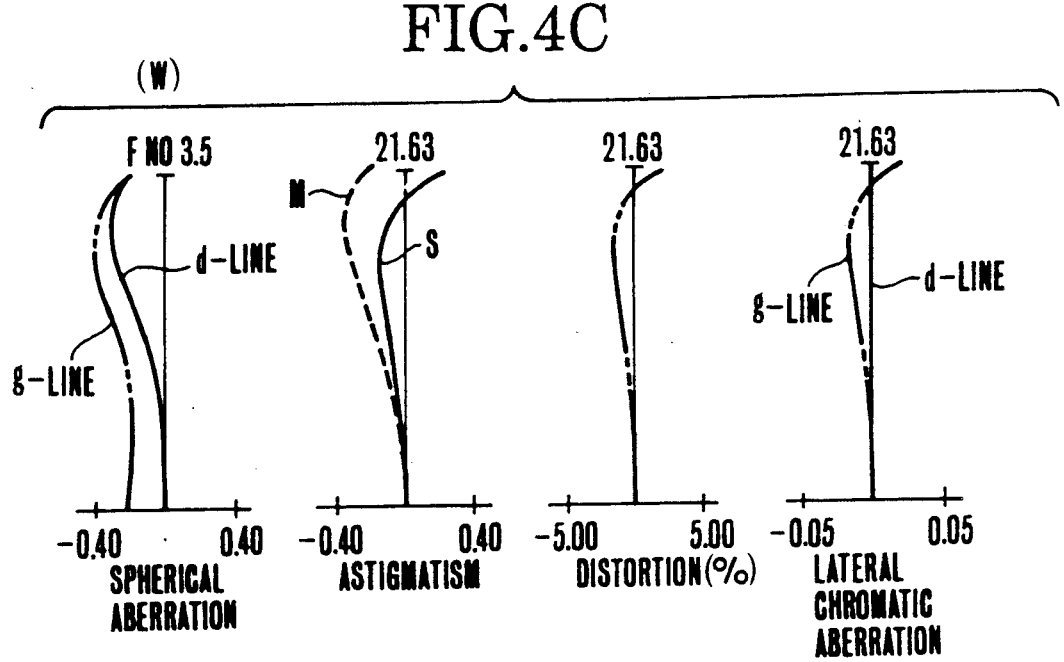
Figure 4D:
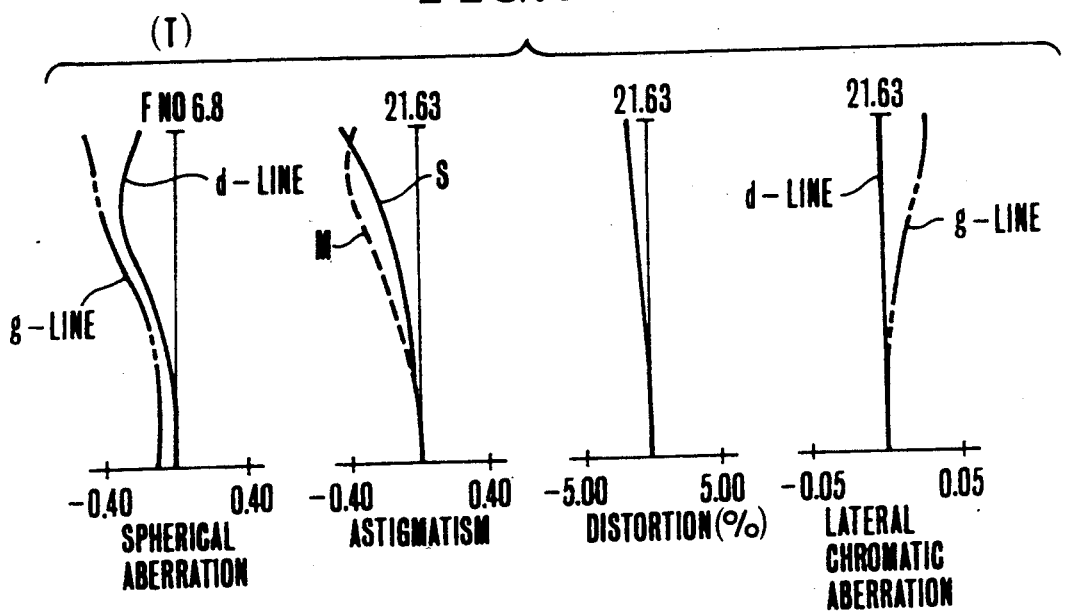
Figure 5A:
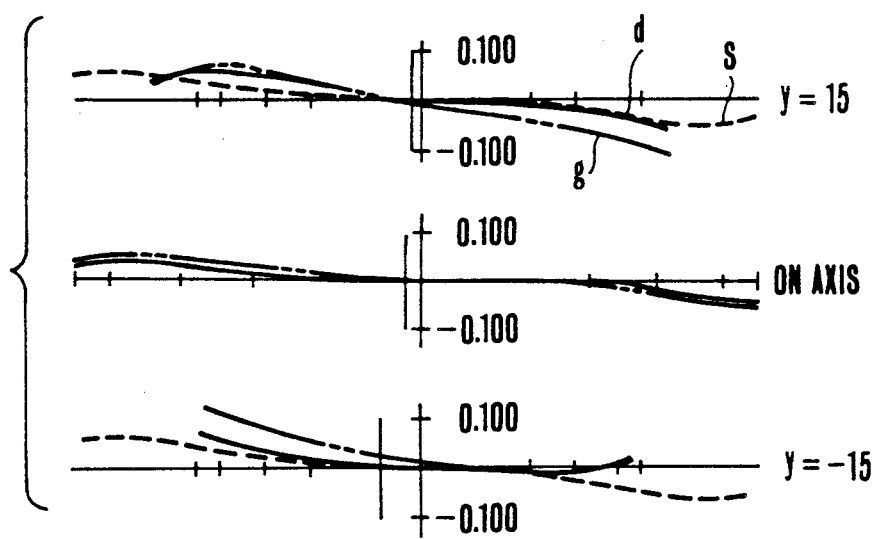
FIGS. 5A and 5B, FIGS. 7A and 7B and FIGS. 9A and 9B are aberration curves obtained when the shake compensation is once performed by the second lens sub-group of the first lens group in the numerical examples 1 to 3 of the invention.
Figure 5B:
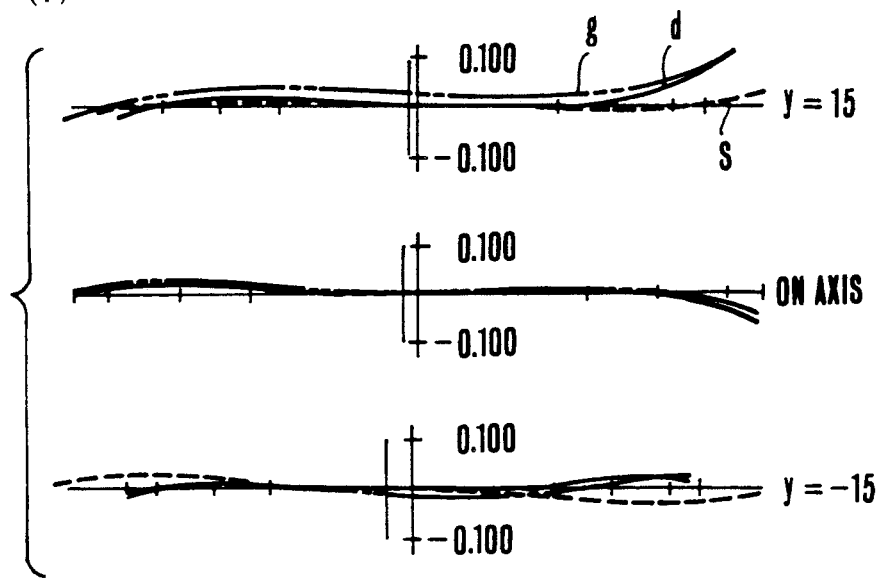
Figure 6A:
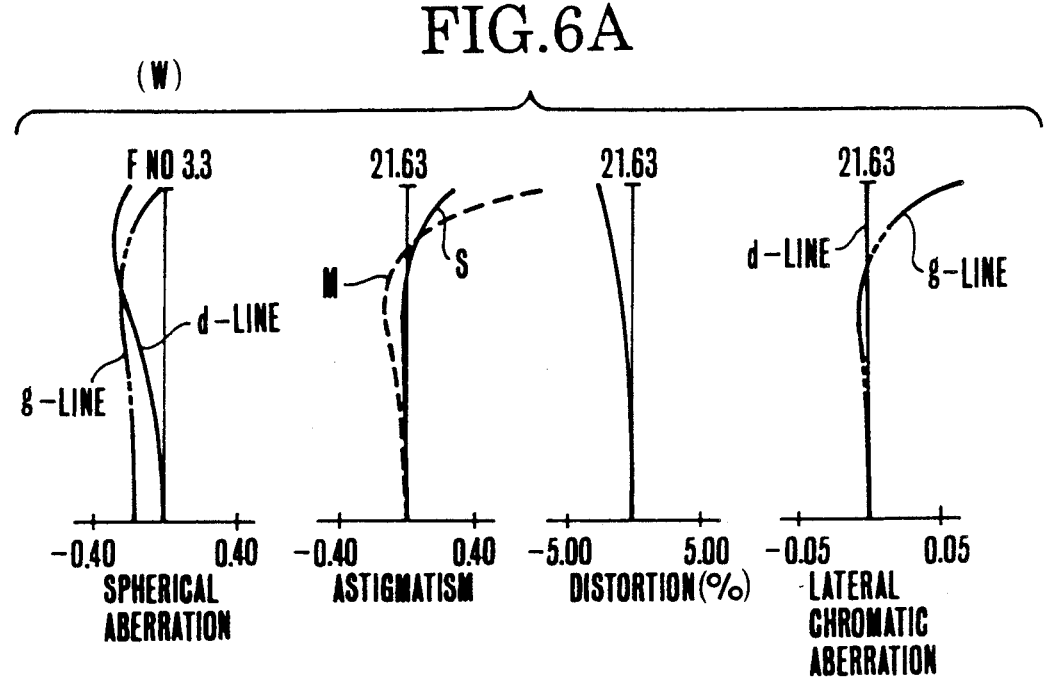
Figure 6B:
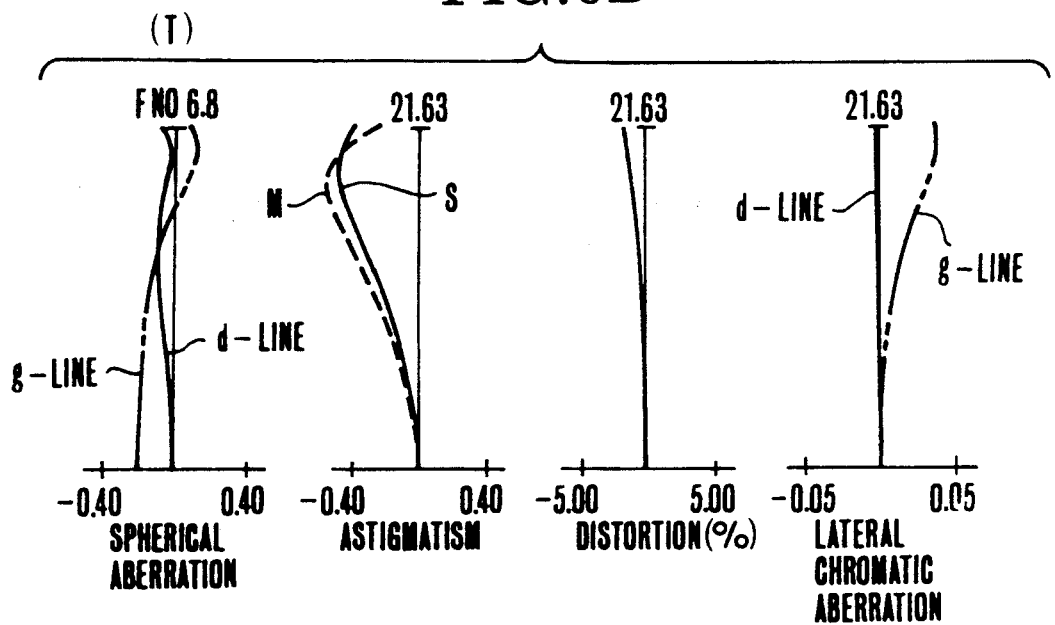
Figure 6C:
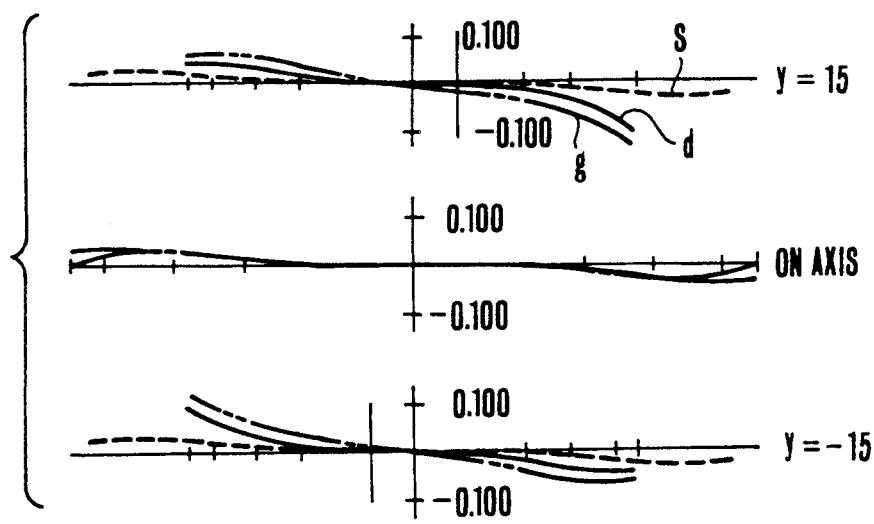
Figure 6D:
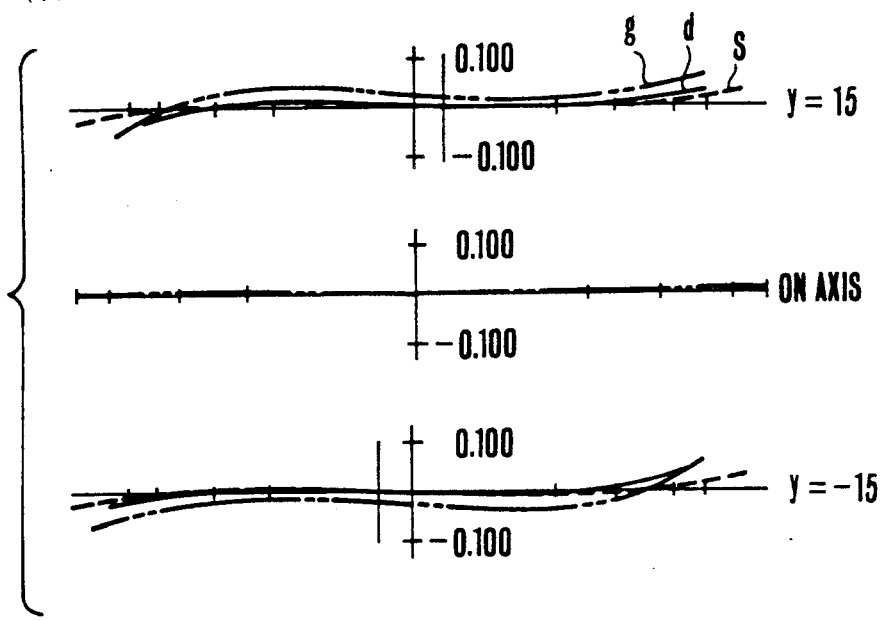
Figure 7A:
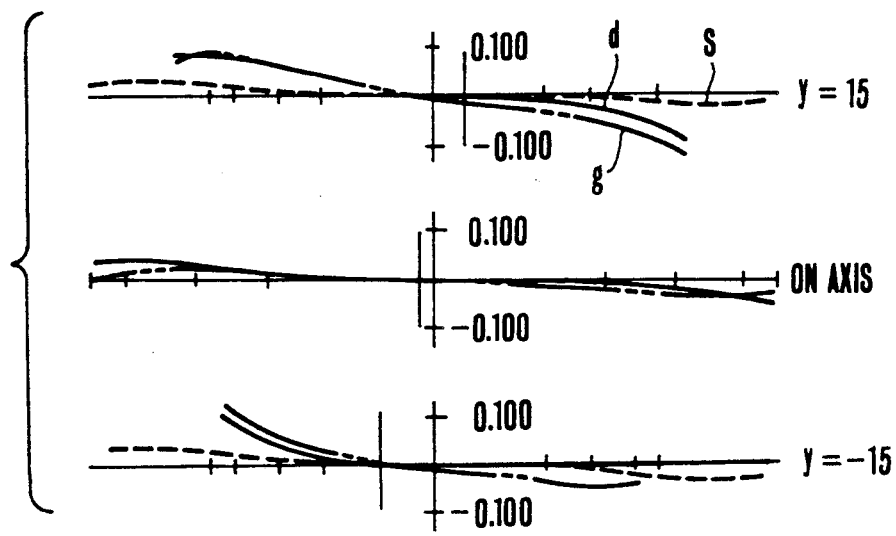
Figure 7B:
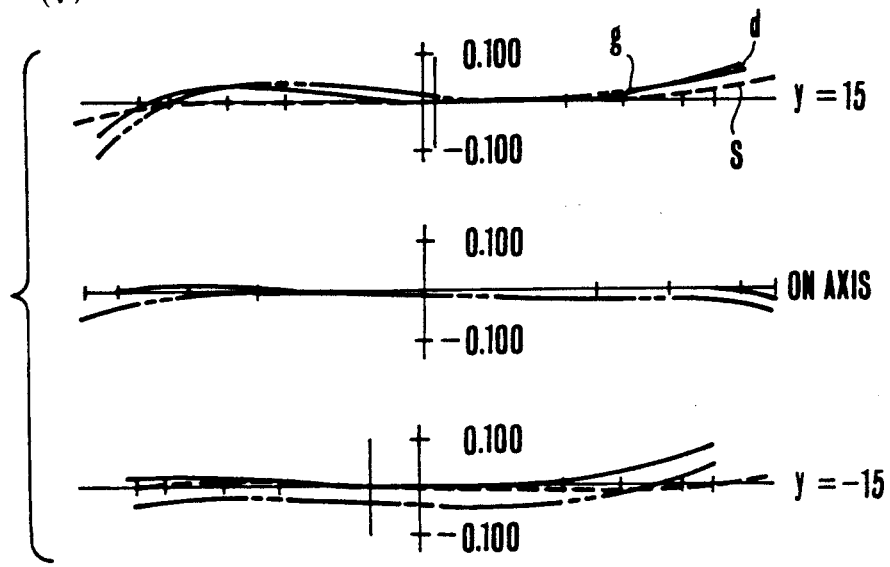
Figure 8A:
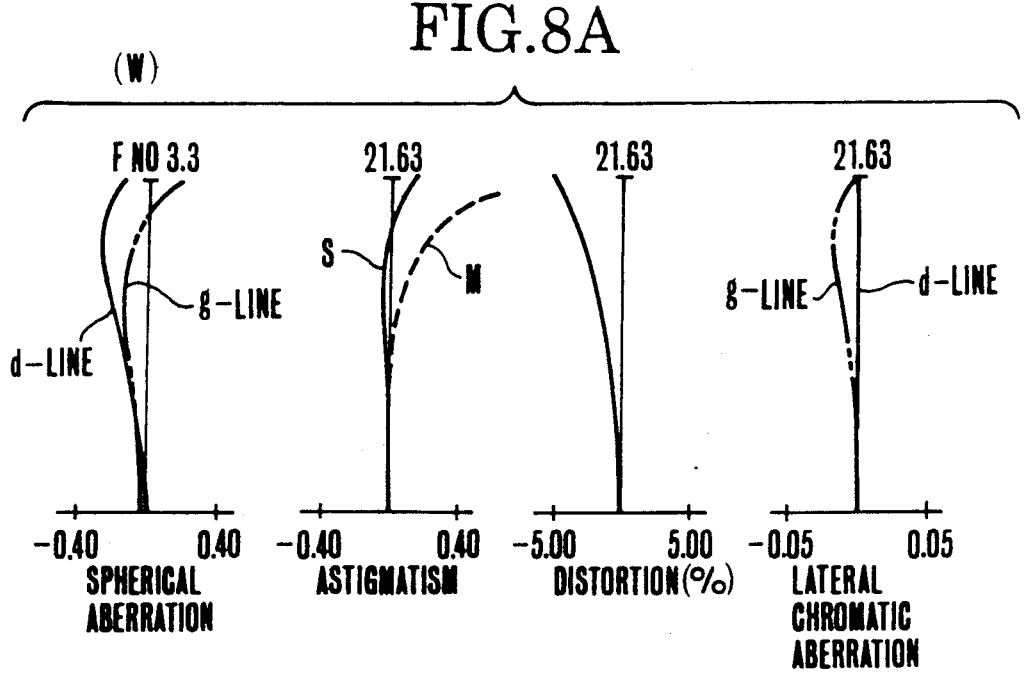
Figure 8B:
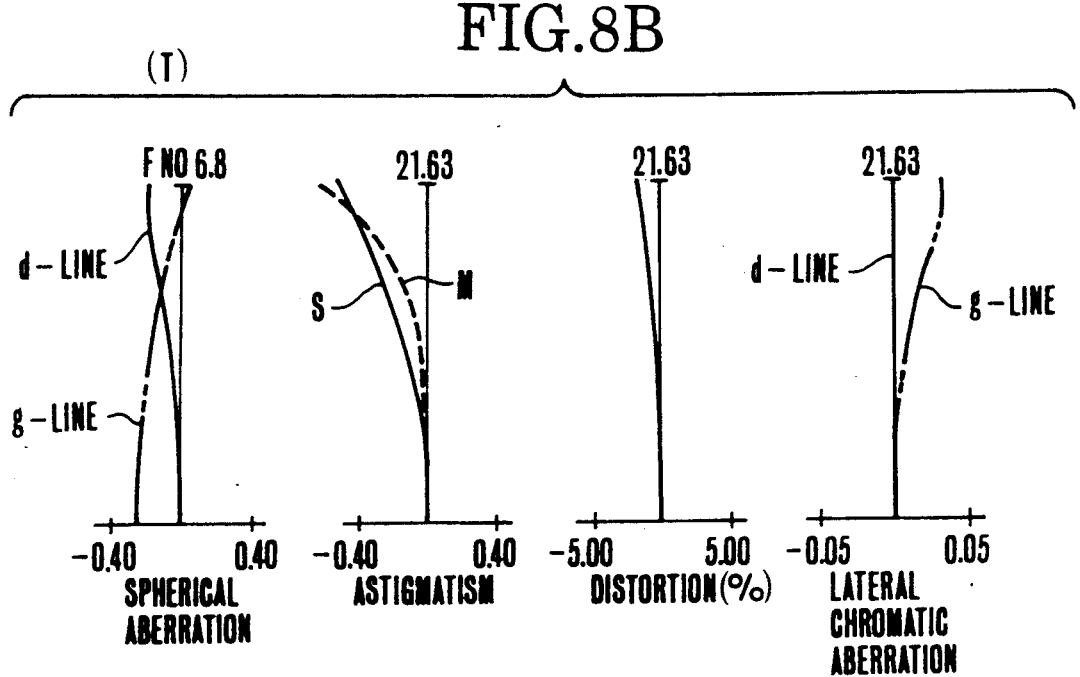
Figure 8C:
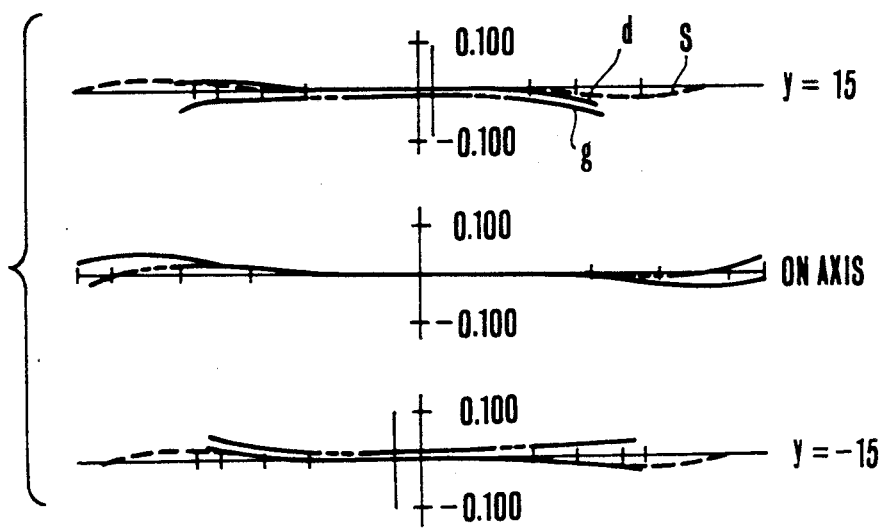
Figure 8D:
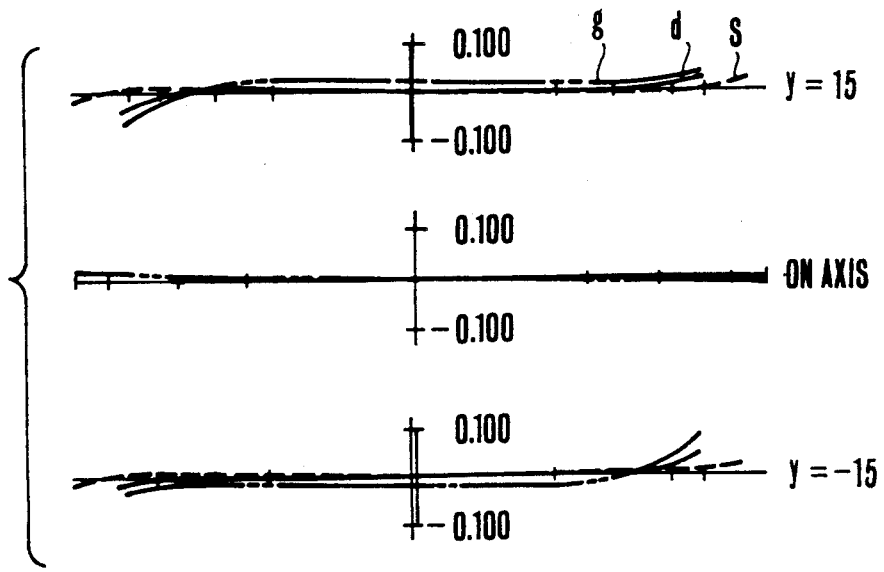
Figure 9A:
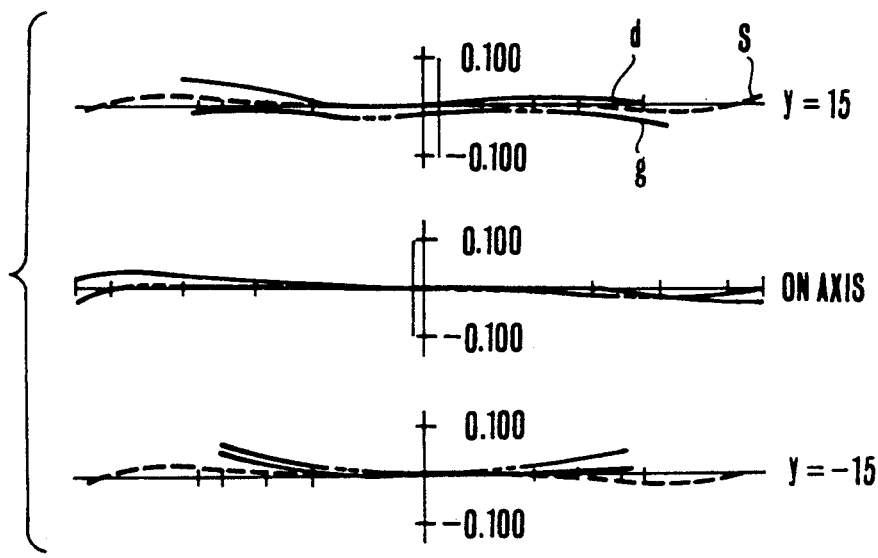
Figure 9B:
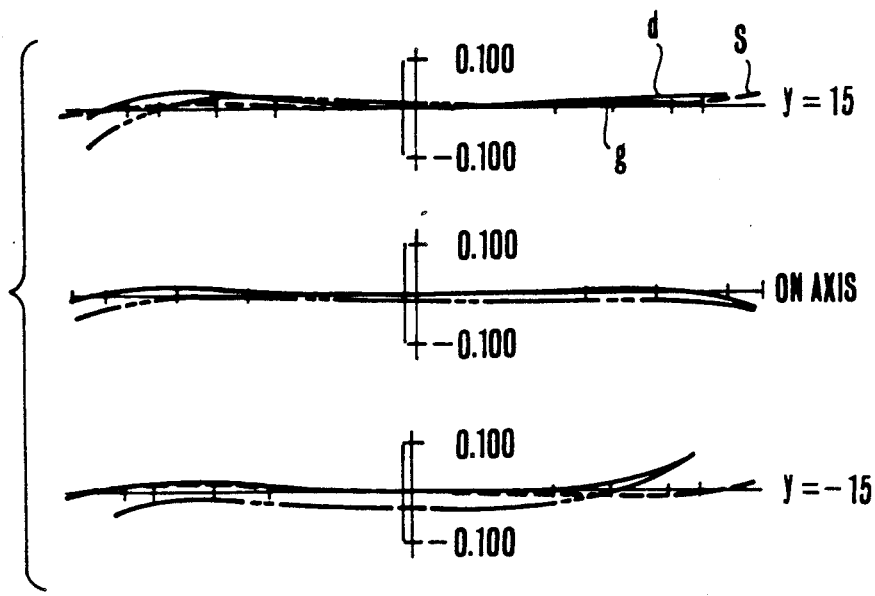
Figure 10A:
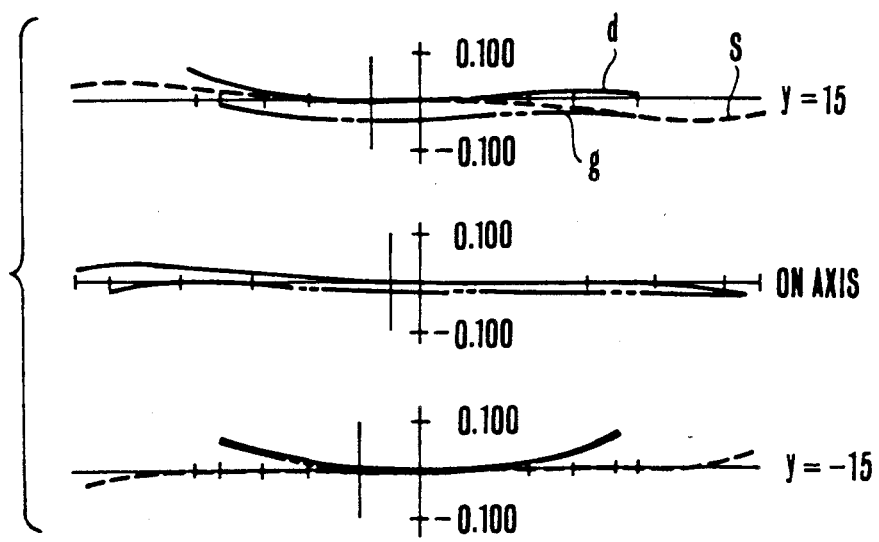
FIGS. 10A and 10B are aberration curves obtained when the shake compensation is once performed by the first lens sub-group of the first lens group in the numerical example 3 of the invention.
Figure 10B:
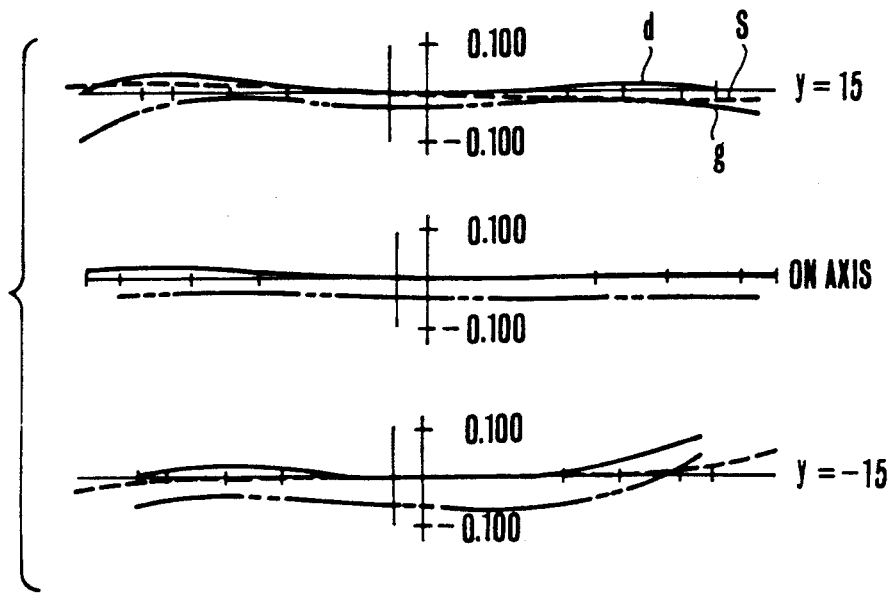

FIG. 1 to FIG. 3 are lens block diagrams of numerical examples 1 to 3 to be described later of variable magnification optical systems according to the invention.

In the figures, reference Roman numeral I denotes a first lens group of positive refractive power, and reference Roman numeral II denotes a second lens group of negative refractive power. By moving the first lens group I and the second lens group II toward the object side as indicated by arrows, the variation of the image magnification from the wide-angle end to the telephoto end is performed.

The first lens group I includes a first lens sub-group I-1, a stop SP and a second lens sub-group I-2.

In the present embodiment, the shake of the photographic image that occurs when the hand holding the camera shakes, or when the variable magnification optical system vibrates, is compensated for by driving, in the numerical examples shown in FIG. 1 and FIG. 2, the second lens sub-group I-2, or in the numerical example shown in FIG. 3, the first lens sub-group I-1 or the second lens sub-group I-2. In either case, one of the lens sub-groups is compensation lens group, that will parallel-decenter in a direction perpendicular to the optical axis.

Meanwhile, focusing is performed, in each of the examples of FIGS. 1, 2 and 3, by axially moving the first lens sub-group I-1 which is arranged in front of the stop SP. Particularly in the example of FIG. 3, a positive lens and a negative lens constituting the front lens group are axially moved in unison, thereby lessening the driving power for the focusing lens group and reducing the variation with focusing of the amount of light in the marginal zone of the image plane.

Thus, in the present embodiment, the lens group to be used for decentering and the lens group for focusing are made to be separated from each other, with an advantage that the mechanical complexity is prevented from increasing so as to achieve simplification of the driving system for each lens group.

In the present embodiment, the amount of shake $\delta$ of the photographic image is detected by shake detecting means 1 such as an acceleration sensor or an angular acceleration sensor disposed inside the camera and, on the basis of the decentering sensitivity S of the compensation lens group which is inherent in the variable magnification optical system, the needed amount of parallel-decentering drive E of the compensation lens group for compensating the shake of the photographic image is obtained by a computing circuit 2. Reference numeral 3 denotes drive means utilizing a laminated piezoelectric element for driving the compensation lens group according to the output of the computing circuit 2.

Incidentally, in FIGS. 2 and 3, the detecting means 1, the computing circuit 2 and the drive means 3 are omitted from the illustration.

Also, the amount of parallel-decentering drive E for shake compensation can be obtained by the formula: $E=\delta/S$.

An especial feature of the present embodiment is that the variable magnification optical system is constructed as described above, wherein part of the first lens group, i.e., the first lens sub-group, is made to be a compensation lens group for compensating for the shake of the photographic image, and arranged to move to decenter in a direction perpendicular to the optical axis, whereby it is made possible that the decentering movement does not depend on the focal length, thus always becoming constant.

Next, will be discussed is the relationship between the amount of shake of the photographic image and the amount of movement required for compensating for that amount by shake of the compensation lens group in the variable magnification optical system.

Now, the first lens group I of the variable magnification optical system as expanded to the general case is assumed to comprise three lens sub-groups Ia, Ib and Ic in this order from the front, of which the lens sub-group Ib is made to be the compensation lens group and to move so as to parallel-decenter.

Suppose that the focal length of the lens sub-group Ia is denoted by fIa, and the image magnifications of the lens sub-group Ib, the lens sub-group Ic and the second lens group II in the wide-angle end are denoted by $\beta$IbW, $\beta$IcW and $\beta$IIW respectively, likewise the image magnifications of the same in the telephoto end are denoted by $\beta$IbT, $\beta$IcT and $\beta$IIT respectively.

Now, when the camera tilts an angle $\theta$, the compensation lens group must be moved to decenter in the wide-angle end or the telephoto end by an amount EWb or ETb respectively. Then, the following expressions are given:

$$EWb = \frac{fIa \cdot \beta IbW \cdot \tan\theta}{(1 - \beta IbW)}$$

$$ETb = \frac{fIa \cdot \beta IbT \cdot \tan\theta}{(1 - \beta IbT)}$$

In order that the amount of decentering drive of the compensation lens group remains constant irrelevant to the focal length, from EWb=ETb, $$\frac{\beta IbW}{(1 - \beta IbW)} = \frac{\beta IbT}{(1 - \beta IbT)}$$

is obtained. Further $$\beta IbW = \beta IbT \tag{A}$$

is obtained.

Alternatively assuming that the compensation lens group for image shake compensation is chosen at the lens sub-group Ia, then its amounts of decentering drive EWa and ETa in the wide-angle end and the telephoto end respectively are as follows:

$$EWa = \frac{fIa}{(1 - \beta IaW)}$$

$$ETa = \frac{fIa}{(1 - \beta IaT)}$$

where $\beta IaW$ and $\beta IaT$ are the image magnifications of the lens sub-group Ia in the wide-angle end and the telephoto end respectively.

From EWa=ETa, the following condition is obtained:

$$\beta IaW = \beta IaT \quad (B)$$

Assuming alternatively again that the compensation lens group for image shake compensation is chosen at the lens sub-group Ic, then its amounts of decentering drive EWc and ETc in the wide-angle end and the telephoto end respectively are as follows:

$$EWc = \frac{fIab \cdot \beta IcW}{(1 - \beta IcW)}$$

$$ETc = \frac{fIab \cdot \beta IcT}{(1 - \beta IcT)}$$

where $\beta IcW$ and $PIcT$ are the image magnifications of the lens sub-group Ic in the wide-angle end and the telephoto end respectively, and fIab is the composite focal length of the lens sub-groups Ia and Ib.

From EWc=ETc, the following condition is obtained:

$$\beta IcW = \beta IcT \quad (C)$$

Since any of the lens sub-groups Ia, Ib and Ic in the first lens group I has its spacing from the adjacent one remain unchanged during the time when the image magnification varies, the conditions of the equations (A), (B) and (C) are always satisfied. For this reason, regardless of the choice of any lens sub-group in the first lens group for employment as the compensation lens group, the required amount of decentering drive for the angle $\theta$ of tilting of the camera can be made constant throughout the entire zooming range.

In the present embodiment, by utilizing such optical properties, a simple form of variable magnification optical system is achieved, thus contributing to prevention of the structure of construction of the operating mechanism for the compensation lens group from becoming complicated.

Next, rules of lens design which are characteristic of the present embodiment are explained successively.

(i) The first lens group is divided into two lens sub-groups, i.e., a first lens sub-group and a second lens sub-group, with a stop intervening therebetween, one of which lens sub-groups is used as the compensation lens group, while the other is used as focusing the lens group. By this, the variation of the decentering aberrations is lessened, and, in a case where the camera is of the lens shutter type, to assemble the shutter and the focusing actuator in the form of a unit becomes relatively easy. Thus, a variable magnification optical system which is free from mechanical interference and works on mechanisms of simplified structure.

In particular, in the present embodiment, the first lens group I is made up from two lens sub-groups, of which the first lens sub-group I-1 is of negative refractive power and the second lens sub-group I-2 is of positive refractive power, and either the first lens sub-group I-1 or the second lens sub-group I-2 is arranged to move in decentering way, so that the decentering aberrations, mainly the curvature of field, are decreased for maintenance of better optical performance.

Next, the generation of decentering aberrations by the movement of the compensation lens group in the direction perpendicular to the optical axis in an arbitrary refractive power arrangement is explained from the standpoint of the theory of aberrations on the basis of the method presented by Yoshiya Matsui in the 23rd Applied Physics Lecture (1962).

When one lens group P constituting part of the variable magnification optical system is parallel-decentered by E, the entire system produces an amount of aberrations $\Delta Y1$. This amount is defined by the sum of the amount of aberrations $\Delta Y$ before the decentering and the amount of decentering aberrations $\Delta Y(E)$ produced by the decentering, as in an equation (a). Here, the amount of aberrations $\Delta Y$ is represented by spherical aberration (I), coma (II), astigmatism (III), the Petzval sum (P) and distortion (V).

Also, the decentering aberrations $\Delta Y(E)$ are represented, as shown in an equation (c), by primary decentering coma (IIE), primary decentering astigmatism (IIIE), primary decentering curvature of field (PE), primary distortion (VE1), primary decentering distortional surplus aberration (EV2) and primary original point shift ($\Delta E$).

Equations (d) to (i) for the aberrations ($\Delta E$) to (VE2) are expressed also in connection with the variable magnification optical system whose lens group P is made to parallel-decenter by using the angles of incidence, $\alpha p$ and $\alpha p$ of the marginal and principal light rays on the lens group P at which the lens group P has aberration coefficients Ip, IIp, IIIp, Pp, and Vp, and lens groups which are arranged on the image plane side of the lens group P all taken as one lens group Q have the aberration coefficients Iq, IIq, IIIq, Pq and Vq.

$$\Delta Y1 = \Delta Y + \Delta Y(E) \quad (a)$$

$$\Delta Y = -\frac{1}{2\alpha'k} [(N_1 \tan\omega)^3 \cos\phi\omega \cdot V + \quad (b)$$
$$(N_1 \tan\omega)^2 R\{2\cos\phi\omega\cos(\phi_R - \phi\omega) \cdot III + $$
$$\cos\phi_R(III + P)\} + $$
$$(N_1 \tan\omega) R^2\{2\cos\phi_R\cos(\phi_R - \phi\omega) + $$
$$\cos\phi\omega\} \cdot II + $$
$$R^3\cos\phi_R \cdot I]$$

$$\Delta Y(E) = -\frac{E}{2\alpha'k} [(N_1 \tan\omega)^2\{(2 + \cos2\phi\omega)(VE1) - \quad (c)$$
$$(VE2)\} + $$
$$2(N_1 \tan\omega) R[\{2\cos(\phi_R - \phi\omega) + $$
$$\cos(\phi_R + \phi\omega)\}(IIIE) + \cos\phi_R\cos\phi\omega(PE)] + $$
$$R^2(2 + \cos2\phi_R)(IIE)] - \frac{E}{2\alpha'k} (\Delta E)$$

$$(\Delta E) = -2(\alpha'p - \alpha p) = -2hp\phi p \quad (d)$$

-continued $$(IIE) = \alpha'pIIq - \alpha p(IIp + IIq) - \alpha'pIq + \alpha p(Ip + Iq)$$
$$= hp\phi pIIq - \alpha pIIp - (hp\phi pIq - \alpha pIp)$$ (e)

$$(IIIE) = \alpha'pIIIq - \alpha p(IIIp + IIIq) - \alpha'pIIq + \alpha p(IIp + IIq)$$
$$= hp\phi pIIIq - \alpha pIIIp - (hp\phi pIIq - \alpha pIIp)$$ (f)

$$(PE) = \alpha'pPq - \alpha p(Pp + Pq)$$
$$= hp\phi pPq - \alpha pPp$$ (g)

$$(VE1) = \alpha'pVq - \alpha p(Vp + Vq) - \alpha'pIIIq + \alpha p(IIIp + IIIq)$$
$$= hp\phi pVq - \alpha pVp - (hp\phi pIIIq - \alpha pIIIp)$$ (h)

$$(VE2) = \alpha'pPq - \alpha p(Pp + Pq)$$
$$= hp\phi pPq - \alpha pPp$$ (i)

From the foregoing equations, to minimize the decentering aberrations produced, it becomes necessary either to take the various aberration coefficients Ip, IIp, IIIp, Pp and Vp of the lens group P at small values, or to set the various aberration coefficients in so good balance as to cancel each other as shown by the equations (a) to (i).

For example, taking an example of the decentering curvature of field PE, ($\alpha'p - \alpha p$) is positive, Pq is negative, p is negative, and Pp is positive. In respect to the decentering curvature of field PE, therefore, the lens group P (lens sub-group Ib) and the lens group Q (the second lens group II) cancel each other. By this, the decentering curvature of field PE can be minimized.

The other decentering aberrations also can be canceled out likewise by the lens group P and the lens group Q. If, instead of the lens sub-group Ib of positive refractive power, the lens sub-group Ia of negative refractive power (the first lens sub-group I-1) is used as the compensation lens group, $\alpha p=0$ and $Pq\approx 0$ result. Even in this case, the decentering curvature of field PE can likewise be minimized.

Besides this, in the present embodiment, if, as the first lens group is constructed with two lens sub-groups both being of positive refractive power, the front one or the lens sub-group Ia is used as the compensation lens group, $\alpha p=0$ and $Pq\approx 0$ result. Therefore, likewise the decentering curvature of field can be minimized. Besides this, in a case where the lens sub-group Ib is used as the compensation lens group, because the light beam traveling toward the lens sub-group Ib becomes convergent, the effective diameter of the lenses in the lens sub-group Ib can be reduced, thereby giving an additional advantage that reduction of the weight of the lens sub-group Ib becomes easy to do.

(ii) As the aforesaid first lens group I is constructed from two lens sub-groups, of which the first lens sub-group I-1 counting from the front is of negative refractive power and the second lens sub-group I-2 is of positive refractive power, the first lens sub-group I-1 is axially moved to effect focusing, while the second lens sub-group I-2 is moved in decentering way to compensate for the shake of the photographic image.

Also, letting the focal lengths of the first lens sub-group I-1 and the second lens sub-group I-2 be denoted by f11 and f12 respectively, the following conditions are satisfied:

$$-9.0 < f11/fW < -1.0 \quad (1)$$

$$0.5 < f12/fW < 1.0 \quad (2)$$

where fW is the shortest focal length of the entire lens system.

By this, while a predetermined sensitivity (the ratio of the amount of shift of the image to the amount of decentering the compensation lens group) is obtained, good optical performance is preserved.

Also, by arranging the focusing lens group on the object side of the compensation lens group, the variation of the aberrations resulting from the variation of the object distance, particularly variation of astigmatism, is so minimized as to obviate the necessity of changing the amount of decentering drive of the compensation lens group. Thus, the amount of decentering drive becomes constant irrelevant to the object distance.

When the refractive power of the first lens sub-group I-1 becomes too strong beyond the lower limit of the inequalities of condition (1), the use of the first lens sub-group I-1 for focusing purposes leads to an increase in the variation of the aberrations resulting from the focusing of the aberrations. When the refractive power of the first lens sub-group I-1 becomes too weak beyond the upper limit, coma largely increases over the entire area of the image plane. So it is no good.

The inequalities of condition (2) concern with the refractive power of the second lens sub-group I-2 that is used as the compensation lens group. When the lower limit is exceeded, under-correction of spherical aberration results on the wide-angle side. Also on the telephoto side, the decentering coma comes to increase. Conversely when the upper limit is exceeded, the sensitivity for parallel-decentering drive of the second lens sub-group I-2 that is used as the compensation lens group becomes too small. Therefore, the entirety of the lens system gets larger in size objectionably.

(iii) The aforesaid first lens sub-group I-1 has at least one negative lens, the radius of curvature of the front lens surface of the negative lens Na of the object side being denoted by RNa, and the aforesaid second lens sub-group I-2 has at least two positive lenses, the radii of curvature of the front and rear lens surfaces of the front positive lens Pa being denoted by RPa1 and RPa2 respectively, the radii of curvature of the front and rear lens surfaces of the rear positive lens Pb being denoted by RPb1 and RPb2 respectively, and the axial thickness of the second lens sub-group I-2 being denoted by D12L, wherein the following conditions are satisfied:

$$-1.1 < RNa/fW < -0.25 \quad (3)$$

$$-1.2 < RPa2/RPa1 < -0.3 \quad (4)$$

$$|RPb2/RPb1| < 0.8 \quad (5)$$

$$0.1 < D12L/fW < 0.55 \quad (6)$$

The form and arrangement of the certain lenses of the first lens sub-group I-1 and the second lens sub-group I-2 are specified in the manner descried above, whereby the optical performance over the entire area of the image plane remains excellent.

The inequalities of condition (3) are to well correct mainly the coma and astigmatism. When the lower limit is exceeded, larger coma and higher order aberrations are produced. When the upper limit is exceeded, undercorrection of astigmatism results in the middle zooming position. So it is no good.

The inequalities of condition (4) is to correct mainly the decentering coma and higher order aberrations in good balance. When the curvature of the front lens surface becomes strong beyond the lower limit, the spherical aberration produced within the interior of the second lens sub-group I-2 gets larger, and the decentering coma comes to increase on the telephoto side. When the curvature of the rear lens surface becomes strong beyond the upper limit, higher order aberrations come to increase objectionably.

The inequality of condition (5) is to well correct mainly the decentering astigmatism. When the curvature of the front lens surface becomes strong out of the condition, the astigmatism produced by the second lens sub-group I-2 increases so that particularly on the telephoto side, it becomes difficult to well correct the decentering astigmatism.

The inequalities of condition (6) concern with the axial length of the second lens sub-group I-2 and are to well correct mainly the decentering distortion. When the lower limit is exceeded, large decentering distortion is produced on the wide angle side. When the upper limit is exceeded, the size of the second lens sub-group I-2 comes to increase objectionably.

(iv) The aforesaid second lens sub-group I-2 has at least one negative lens Nb and the aforesaid second lens group II has at least one positive lens Pc, the Abbe numbers $\nu$Nb and $\nu$Pc of the material of the negative lens Nb and the positive lens Pc respectively satisfying the following conditions:

$$\nu Nb < 40 \quad (7)$$

$$\nu Pc < 42 \quad (8)$$

By this, variation of lateral chromatic aberration with zooming and the decentering lateral chromatic aberration at the time of decentering drive of the second lens sub-group I-2 are corrected well.

When the inequalities of conditions (7) and (8) are violated, variation of the lateral chromatic aberration and the decentering lateral chromatic aberration in either case is increased objectionably.

(v) If, in the present embodiment, the first two lenses counting from the front of the first lens sub-group I-1 are constructed from a positive lens and a negative lens, and these two lenses are axially moved for focusing purposes, advantages are produced that the weight of the focusing lens group is decreased and variation with focusing of the amount of light in the marginal zone can be lessened.

Next, numerical examples 1 to 3 of the invention are shown. In the numerical examples 1 to 3, Ri is the radius of curvature of the i-th lens surface counting from the front, Di is the i-th lens thickness or air separation counting from the front, and Ni and $\nu$i are respectively the refractive index and Abbe number of the glass of the i-th lens element counting from the front.

The shape of an aspheric surface is expressed in coordinates with X-axis in the axial direction and H-axis in the perpendicular direction to the optical axis, the direction in which light advances being taken as positive, by the following equation:

$$X = \frac{(1/R)H^2}{1 + \sqrt{1 - (H/R)^2}} + AH^2 + BH^4 + CH^6 + DH^8 + EH^{10} + A'H^3 + B'H^5 + C'H^7 + D'H^9$$

where R is the paraxial radius of curvature, and A, B, C, D and E are the aspheric coefficients.

Also, the relationship between the above-described individual conditions and the numerical examples 1 to 3 is shown in Table-1.

| Numerical Example 1: | | | |
|---|---|---|---|
| F = 40.72–81.93 | FNo = 1:3.5–6.8 | | 2$\omega$ = 29.6°–60.0° |
| *R 1 = 26.77 | D 1 = 3.70 | N 1 = 1.58258 | $\nu$ 1 = 40.9 |
| R 2 = 48.36 | D 2 = 7.23 | | |
| R 3 = −17.75 | D 3 = 2.00 | N 2 = 1.83481 | $\nu$ 2 = 42.7 |
| R 4 = −137.80 | D 4 = 0.7 | | |
| R 5 = −30.40 | D 5 = 3.75 | N 3 = 1.77250 | $\nu$ 3 = 49.6 |
| R 6 = −17.74 | D 6 = 1.19 | | |
| R 7 = Stop | D 7 = 1.6 | | |
| R 8 = 28.12 | D 8 = 3.70 | N 4 = 1.51633 | $\nu$ 4 = 64.1 |
| R 9 = −11.95 | D 9 = 0.0 | | |
| R10 = −11.95 | D10 = 2.50 | N 5 = 1.83400 | $\nu$ 5 = 37.2 |
| R11 = −28.16 | D11 = 1.43 | | |
| R12 = −34.54 | D12 = 1.80 | N 6 = 1.68883 | $\nu$ 6 = 44.8 |
| R13 = −21.10 | D13 = Variable | | |
| R14 = −45.02 | D14 = 4.00 | N 7 = 1.83400 | $\nu$ 7 = 37.2 |
| R15 = −19.52 | D15 = 2.35 | | |
| R16 = −15.09 | D16 = 1.80 | N 8 = 1.65727 | $\nu$ 8 = 60.0 |
| R17 = −57.87 | D17 = 0.93 | | |
| *R18 = −37.46 | D18 = 1.50 | N 9 = 1.83400 | $\nu$ 9 = 37.2 |
| R19 = −295.84 | | | |

| | f = 40.72 | f = 56.68 | f = 81.93 |
|---|---|---|---|
| D13 | 16.9 | 8.0 | 1.0 |

| *Aspheric coefficients for R1 | *Aspheric Coefficient for R18 |
|---|---|
| B = 1.418 × E-5 | B = 2.998 × E-6 |
| C = 1.273 × E-11 | C = 7.381 × E-8 |
| D = 6.169 × E-10 | A' = 3.992 × E-5 |
| A' = −4.401 × E-5 | B' = −7.912 × E-7 |

-continued

Numerical Example 1:

$B' = -8.426 \times E-7$
$C' = -1.179 \times E-8$

Numerical Example 2:

| F = 38.53–79.10 | | FNo = 1:3.3–6.8 | | $2\omega$ = 30.6°–58.6° | |
|---|---|---|---|---|---|
| F 1 = | 18.64 | D 1 = 4.00 | | N 1 = 1.59270 | $\nu$ 1 = 35.3 |
| F 2 = | 19.12 | D 2 = 2.68 | | | |
| R 3 = | −20.96 | D 3 = 0.80 | | N 2 = 1.83481 | $\nu$ 2 = 42.7 |
| R 4 = | −111.37 | D 4 = 1.08 | | | |
| R 5 = | −39.53 | D 5 = 3.68 | | N 3 = 1.78472 | $\nu$ 3 = 25.7 |
| R 6 = | −20.81 | D 6 = 4.89 | | | |
| R 7 = | Stop | D 7 = 0.96 | | | |
| R 8 = | 20.45 | D 8 = 4.00 | | N 4 = 1.51633 | $\nu$ 4 = 64.1 |
| R 9 = | −15.04 | D 9 = 0.0 | | | |
| R10 = | −15.04 | D10 = 3.00 | | N 5 = 1.80518 | $\nu$ 5 = 25.4 |
| R11 = | 191.97 | D11 = 0.77 | | | |
| R12 = | 118.94 | D12 = 3.88 | | N 6 = 1.68893 | $\nu$ 6 = 31.1 |
| *R13 = | −22.98 | D13 = Variable | | | |
| R14 = | −61.46 | D14 = 4.00 | | N 7 = 1.80518 | $\nu$ 7 = 25.4 |
| R15 = | −18.71 | D15 = 2.33 | | | |
| *R16 = | −12.74 | D16 = 1.50 | | N 8 = 1.83400 | $\nu$ 8 = 37.2 |
| R17 = | 904.57 | | | | |

| | f = 38.54 | f = 51.82 | f = 79.10 |
|---|---|---|---|
| D13 | 16.42 | 10.37 | 4.32 |

| *Aspheric Coefficients for R13 | *Aspheric Coefficients for R16 |
|---|---|
| B = 1.037 × E-5 | B = 2.436 × E-5 |
| C = 3.371 × E-8 | C = 1.609 × E-8 |
| D = −1.085 × E-9 | D = −6.246 × E-10 |
| E = 2.265 × E-12 | E = 8.692 × E-12 |
| A' = 1.991 × E-5 | A' = 3.935 × E-5 |
| B' = 2.569 × E-7 | B' = 7.147 × E-7 |
| C' = 4.131 × E-9 | C' = 1.150 × E-8 |
| D' = 2.448 × E-11 | D' = 4.543 × E-11 |

Numerical Example 3:

| F = 37.59–77.61 | | FNo = 1:3.3–6.8 | | $2\omega$ = 31.2°–59.8° | |
|---|---|---|---|---|---|
| R 1 = | 12.78 | D 1 = 3.00 | | N 1 = 1.59270 | $\nu$ 1 = 35.3 |
| R 2 = | 13.46 | D 2 = 2.16 | | | |
| R 3 = | −32.18 | D 3 = 1.20 | | N 2 = 1.81600 | $\nu$ 2 = 46.6 |
| R 4 = | 43.18 | D 4 = 0.55 | | | |
| R 5 = | −72.88 | D 5 = 0.70 | | N 3 = 1.74100 | $\nu$ 3 = 52.6 |
| R 6 = | 50.87 | D 6 = 2.80 | | N 4 = 1.69895 | $\nu$ 4 = 30.1 |
| R 7 = | −26.02 | D 7 = 1.19 | | | |
| R 8 = | Stop | D 8 = 1.00 | | | |
| R 9 = | 17.54 | D 9 = 3.80 | | N 5 = 1.53375 | $\nu$ 5 = 55.5 |
| R10 = | −16.39 | D10 = 0.0 | | | |
| R11 = | −16.39 | D11 = 1.70 | | N 6 = 1.84666 | $\nu$ 6 = 23.9 |
| R12 = | −209.52 | D12 = 4.58 | | | |
| R13 = | 55.67 | D13 = 3.00 | | N 7 = 1.62280 | $\nu$ 7 = 57.0 |
| *R14 = | −26.42 | D14 = Variable | | | |
| R15 = | −59.77 | D15 = 4.50 | | N 8 = 1.80518 | $\nu$ 8 = 25.4 |
| R16 = | −20.07 | D16 = 2.73 | | | |
| *R17 = | −13.31 | D17 = 1.50 | | N 9 = 1.83481 | $\nu$ 9 = 42.7 |
| R18 = | 2842.11 | | | | |

| | f = 37.59 | f = 50.65 | f = 77.61 |
|---|---|---|---|
| D14 | 14.42 | 8.37 | 2.32 |

| *Aspheric Coefficients for R14 | *Aspheric Coefficients for R17 |
|---|---|
| B = 3.237 × E-5 | B = 3.297 × E-5 |
| C = 3.067 × E-8 | C = 1.627 × E-7 |
| D = −1.222 × E-11 | D = −1.032 × E-9 |
| E = 6.164 × E-12 | E = 1.646 × E-11 |

(1) The focusing movement of the lens sub-group Ia ($\infty$ − 1 m): −3.58 mm at W, or −3.70 mm at T
(2) The focusing movement of the first two lenses ($\infty$ − 1 m): −0.90 mm at W or −0.93 mm at T

TABLE 1

| Factor in Condition | Numerical Example | | |
|---|---|---|---|
| | 1 | 2 | 3 |
| (1) f11/fW | −6.25 | −4.76 | −1.59 |
| (2) f12/fW | 0.74 | 0.72 | 0.60 |
| (3) RNa/fW | −0.44 | −0.54 | −0.86 |
| (4) RPa2/RPa1 | −0.43 | −0.74 | −0.94 |
| (5) \|RPb2/RPb1\| | 0.61 | −0.193 | −0.48 |
| (6) D12L/fW | 0.23 | 0.30 | 0.35 |
| (7) νNb | 37.2 | 25.4 | 23.9 |
| (8) νPC | 37.2 | 25.4 | 25.4 |

According to the invention, as has been described above, by making use of a lens group of small size and light weight constituting part of the variable magnification optical system as the compensation lens group and compensating for the shake of the photographic image by driving it to decenter, a variable magnification optical system having the function of stabilizing the image, which, while maintaining good optical performance, makes the amount of parallel-decentering drive of the compensation lens group irrelevant to the value of the focal length, and simplifies the structure of the mechanisms, can be achieved. Also, by making use of the lens group arranged on the object side of the compensation lens group as the focusing lens group, it is made possible to achieve a variable magnification optical system having the image stabilizing function in simple form, which makes the amount of parallel-decentering drive of the compensation lens group irrelevant to the object distance.

What is claimed is:

1. A zoom lens having an optical axis for stabilizing an image, comprising:
   a front lens group comprising a compensation lens sub-group which moves in a direction having a directional component transverse to the optical axis to stabilize the image and a front lens sub-group; and
   a rear lens group positioned in the rear of said front lens group,
   wherein zooming is performed by moving said front and rear lens groups along the optical axis.

2. A zoom lens according to claim 1, wherein said front lens group has a positive refractive power and said rear lens group has a negative refractive power.

3. A zoom lens according to claim 2, wherein said front lens group comprises said front lens sub-group having a negative refractive power and said compensation lens sub-group arranged in this order from the front.

4. A zoom lens according to claim 3, further comprising a stop positioned in a space between said front lens sub-group and said compensation lens sub-group.

5. A zoom lens according to claim 4, wherein said front lens sub-group has at least one negative lens, and said compensation lens sub-group has at least two positive lenses, satisfying the following conditions:

$$-1.1 < RNa/fW < -0.25$$

$$-1.2 < RPa2/RPa1 < -0.3$$

$$|RPb2/RPb1| < 0.8$$

$$0.1 < D12L/fW < 0.55$$

where RNa is a radius of curvature of the front lens surface of said negative lens which lies in the frontmost position in said front lens sub-group, RPa1 and RPa2 are radii of curvature of the front and rear lens surfaces of the front one of said two positive lenses respectively, RPb1 and RPb2 are radii of curvature of the front and rear lens surfaces of the rear one of said two positive lenses respectively, D12L is an axial thickness of the entirety of said compensation lens sub-group, and fW is the shortest focal length of the entire lens system.

6. A zoom lens according to claim 5, wherein said compensation lens sub-group has at least one negative lens, and said rear lens group has at least one positive lens, satisfying the following condition:

$$\nu Nb < 40$$

$$\nu Pc < 42$$

where νNb and νPc are Abbe numbers of materials of said negative lens and said positive lens respectively.

7. A zoom lens according to claims 3 or 4, satisfying the following conditions:

$$-9.0 < f11/fW < -1.0$$

$$0.5 < f12/fW < 1.0$$

where f11 and f12 are focal lengths of said front lens sub-group and said compensation lens sub-group, and fW is the shortest focal length of the entire lens system.

8. A zoom lens according to claim 7, wherein said front lens sub-group has at least one negative lens, and said compensation lens sub-group has at least two positive lenses, satisfying the following conditions:

$$-1.1 < RNa/fW < -0.25$$

$$-1.2 < RPa2/RPa1 < -0.3$$

$$|RPb2/RPb1| < 0.8$$

$$0.1 < D12L/fW < 0.55$$

where RNa is a radius of curvature of the front lens surface of said negative lens which lies in the frontmost position in said front lens sub-group, RPa1 and RPa2 are radii of curvature of the front and rear lens surfaces of the front one of said two positive lenses respectively, RPb1 and RPb2 are radii of curvature of the front and rear lens surfaces of the rear one of said two positive lenses respectively, D12L is an axial thickness of the entirety of said compensation lens sub-group, and fW is the shortest focal length of the entire lens system.

9. A zoom lens according to claim 8, wherein said compensation lens sub-group has at least one negative lens, and said rear lens group has at least one positive lens, satisfying the following condition:

$$\nu Nb < 40$$

$$\nu Pc < 42$$

where νNb and νPc are Abbe numbers of materials of said negative lens and said positive lens respectively.

10. A zoom lens according to claim 3, wherein said front lens sub-group has at least one negative lens, and said compensation lens sub-group has at least two positive lenses, satisfying the following conditions:

$$-1.1 < RNa/fW < -0.25$$

$-1.2 < RPa2/RPa1 < -0.3$ $|RPb2/RPb1| < 0.8$ $0.1 < D12L/fW < 0.55$ where RNa is a radius of curvature of the front lens surface of said negative lens which lies in the frontmost position in said front lens sub-group, RPa1 and RPa2 are radii of curvature of the front and rear lens surfaces of the front one of said two positive lenses respectively, RPb1 and RPb2 are radii of curvature of the front and rear lens surfaces of the rear one of said two positive lenses respectively, D12L is an axial thickness of the entirety of said compensation lens sub-group, and fW is the shortest focal length of the entire lines system.

11. A zoom lens according to claim 10, wherein said compensation lens sub-group has at least one negative lens, and said rear lens group has at least one positive lens, satisfying the following condition:

$\nu Nb < 40$ $\nu Pc < 42$ where $\nu Nb$ and $\nu Pc$ are Abbe numbers of materials of said negative lens and said positive lens respectively.

12. A zoom lens according to claim 3, wherein said compensation lens sub-group has at least one negative lens, and said rear lens group has at least one positive lens, satisfying the following condition:

$\nu Nb < 40$ $\nu Pc < 42$ where $\nu Nb$ and $\nu Pc$ are Abbe numbers of materials of said negative lens and said positive lens respectively.

* * * * *

UNITED STATES PATENT AND TRADEMARK OFFICE
CERTIFICATE OF CORRECTION

PATENT NO. : 5,000,549

DATED : March 19, 1991

INVENTOR(S) : Shoichi Yamazaki

It is certified that error appears in the above-identified patent and that said Letters Patent is hereby corrected as shown below:

COLUMN 2

Line 41, "are" should read --is--.

COLUMN 3

Line 46, "is" should read --is a--.

COLUMN 4

Line 25, "is" should be deleted.
    Line 28, "by shake of" should read --of shake by--.

COLUMN 5

Line 61, "focusing the" should read --the focusing--.
    Line 66, "a" should read --there is a--.

COLUMN 6

Line 39, "$\alpha p$" should read --$\overline{\alpha p}$--. (second occurence)

COLUMN 7

Line 4, "$\alpha' p I q + \alpha p (I p + I q)$" should read --$\overline{\alpha' p} I q + \overline{\alpha p}(I p + I q)$--.

UNITED STATES PATENT AND TRADEMARK OFFICE
CERTIFICATE OF CORRECTION

PATENT NO. : 5,000,549
DATED : March 19, 1991
INVENTOR(S) : Shoichi Yamazaki It is certified that error appears in the above-identified patent and that said Letters Patent is hereby corrected as shown below:

COLUMN 7

Line 6, "hpϕpIq - αpIp" should read
--$\overline{hp\phi pIq}$ - $\overline{\alpha pIp}$--.

Line 9, "α'pIIq + αp(IIp + IIq)" should read
--$\overline{\alpha'pIIq}$ + $\overline{\alpha p}$(IIp + IIq)--.

Line 11, "(hpϕpIIq - αpIIp)" should read
--($\overline{hp\phi pIIq}$ - $\overline{\alpha pIIp}$)--.

Line 18, "α'pIIIq + αp(IIIp + IIIq)" should read
--$\overline{\alpha'pIIIq}$ + $\overline{\alpha p}$(IIIp + IIIq)--.

Line 20, "(hpϕpIIIq -αpIIIp)" should read
--($\overline{hp\phi pIIIq}$ -$\overline{\alpha pIIIp}$)--.

Line 22, "(VE2) = α'pPq - αp(Pp + Pq)" should read
--(VE2) = $\overline{\alpha'pPq}$ - $\overline{\alpha p}$(Pp + Pq)--.

Line 23, "= hpϕpPq - αpPp" should read
-- $\overline{hp\phi pPq}$ - $\overline{\alpha pPp}$--.

COLUMN 8

Line 14, "the" should read --of the--.
Line 34, "with" should be deleted.
Line 68, "descried" should read --described--.

UNITED STATES PATENT AND TRADEMARK OFFICE
CERTIFICATE OF CORRECTION

PATENT NO. : 5,000,549
DATED : March 19, 1991
INVENTOR(S) : Shoichi Yamazaki

It is certified that error appears in the above-identified patent and that said Letters Patent is hereby corrected as shown below:

COLUMN 9

Line 9, "is" should read --are--.
Line 26, "with" should be deleted.

COLUMN 10

Numerical Example 1, "*Aspheric Coefficient" should read --*Aspheric Coefficients--.

COLUMN 11

Numerical Example 2, "F1" should read --R1--.
"F2" should read --R2--.

COLUMN 15

Line 18, "lines system" should read --lens system--.

Signed and Sealed this

Thirtieth Day of March, 1993

Attest:

STEPHEN G. KUNIN

Attesting Officer    Acting Commissioner of Patents and Trademarks